(12) United States Patent
Yoon et al.

(10) Patent No.: US 12,546,766 B2
(45) Date of Patent: Feb. 10, 2026

(54) METHOD FOR ANALYZING BIO-SUBSTANCE

(71) Applicant: AJOU UNIVERSITY INDUSTRY-ACADEMIC COOPERATION FOUNDATION, Suwon-si (KR)

(72) Inventors: Hyun Chul Yoon, Seoul (KR); Ka Ram Kim, Suwon-si (KR); Hyeong Jin Chun, Suwon-si (KR); Jae Ho Kim, Suwon-si (KR)

(73) Assignee: AJOU UNIVERSITY INDUSTRY-ACADEMIC COOPERATION FOUNDATION, Suwon-si (KR)

( * ) Notice: Subject to any disclaimer, the term of this patent is extended or adjusted under 35 U.S.C. 154(b) by 1119 days.

(21) Appl. No.: 17/604,010

(22) PCT Filed: Nov. 26, 2019

(86) PCT No.: PCT/KR2019/016304
§ 371 (c)(1),
(2) Date: Jun. 29, 2022

(87) PCT Pub. No.: WO2020/213803
PCT Pub. Date: Oct. 22, 2020

(65) Prior Publication Data
US 2022/0334105 A1    Oct. 20, 2022

(30) Foreign Application Priority Data

Apr. 17, 2019  (KR) ........................ 10-2019-0044811

(51) Int. Cl.
*G01N 33/58*   (2006.01)
*G01N 15/14*   (2024.01)
*G01N 33/53*   (2006.01)

(52) U.S. Cl.
CPC ..... *G01N 33/5306* (2013.01); *G01N 15/1459* (2013.01); *G01N 33/58* (2013.01); *G01N 2015/1486* (2013.01)

(58) Field of Classification Search
None
See application file for complete search history.

(56) References Cited

U.S. PATENT DOCUMENTS

2010/0135566 A1    6/2010  Joanidopoulos et al.

FOREIGN PATENT DOCUMENTS

| KR | 10-2008-0096656 A | 10/2008 |
| KR | 10-2010-0083426 A | 7/2010 |

(Continued)

OTHER PUBLICATIONS

Garvey et al. Microretroreflector-sedimentation immunoassays for pathogen detection. Anal Chem. Sep. 16, 2014;86(18):9029-35. (Year: 2014).*

(Continued)

*Primary Examiner* — Rebecca M Giere
*Assistant Examiner* — Alexander Alexandrovic Volkov
(74) *Attorney, Agent, or Firm* — Sughrue Mion, PLLC (57) ABSTRACT

A bio-substance analysis method using a sensing substrate having a fluid channel is disclosed. The method includes mixing retroreflective particles with a detection solution containing a target bio-substance, wherein a first bio-recognition substance selectively reacting with the target bio-substance is modified on the retroreflective particles; placing the sensing substrate so that a bottom is located under a cover in a direction of gravity; injecting the detection solution containing therein the retroreflective particles into a fluid channel and maintaining the solution in the channel for a first time duration; turning the sensing substrate upside down so that the bottom is located above the cover in the (Continued)

direction of gravity and maintaining the sensing substrate in the turned state for a second time duration; irradiating light into the fluid channel through the bottom; and generating and analyzing an image based on light retroreflected from the retroreflective particles.

9 Claims, 5 Drawing Sheets

(56) References Cited

FOREIGN PATENT DOCUMENTS

| KR | 10-1398764 B1 | 5/2014 |
|---|---|---|
| KR | 10-2017-0075221 A | 7/2017 |

OTHER PUBLICATIONS

Litvinov et al. Centrifugal sedimentation immunoassays for multiplexed detection of enteric bacteria in ground water. Biomicrofluidics. Jan. 12, 2016;10(1):014103. (Year: 2016).*
3M—Product information for Double Coated Tape 9474LE (Year: 2025).*
Sherlock T, Nasrullah A, Litvinov J, Cacao E, Knoop J, Kemper S, Kourentzi K, Kar A, Ruchhoeft P, Willson R. Suspended, micronscale corner cube retroreflectors as ultra-bright optical labels. J Vac Sci Technol B Nanotechnol Microelectron. 2011; 29:06. (Year: 2011).*
Han et al. (ACS Appl Mater Interfaces. May 4, 2016;8(17):10767-74) (Year: 2016).*
Raja B, Pascente C, Knoop J, Shakarisaz D, Sherlock T, Kemper S, Kourentzi K, Renzi RF, Hatch AV, Olano J, Peng BH, Ruchhoeft P, Willson R. An embedded microretroreflector-based microfluidic immunoassay platform. Lab Chip. Apr. 26, 2016;16(9):1625-35. (Year: 2016).*
International Search Report of PCT/KR2019/016304 dated May 25, 2020 [PCT/ISA/210].

* cited by examiner

METHOD FOR ANALYZING BIO-SUBSTANCE

CROSS REFERENCE TO RELATED APPLICATIONS

This application is a National Stage of International Application No. PCT/KR2019/016304 filed on Nov. 26, 2019, claiming priority based on Korean Patent Application No. 10-2019-0044811 filed on Apr. 17, 2019.

FIELD

The present disclosure relates to a method for analyzing a bio-substance that may quantitatively analyze a target bio-substance using an optical scheme.

DESCRIPTION OF RELATED ART

A method using immune and molecular beacons has been frequently used in industry and academia to perform optical quantitative/qualitative analysis of biological analyte. The method performs the analysis based on a detecting result of a signal strength of a signal marker that generates luminescence.

The method satisfies high analytical sensitivity, but requires not only expensive analysis equipment equipped with sophisticated optical devices in terms of an experimental environment, but also a washing process to remove signal markers unreacted with target molecules. However, the washing process is preformed by an analyst manually injecting a washing solution. This process acts as a main cause of signal intensity fluctuation depending on a skill of the analyst.

DISCLOSURE

Technical Purposes

A purpose of the present disclosure is to provide a method for analyzing a bio-substance in which an optical label unreacted with the bio-substance is removed using gravity-based sedimentation, thereby minimizing an error caused by an analyst.

Technical Solutions

One aspect of the present disclosure provides a method for analyzing a bio-substance using a sensing substrate, wherein the sensing substrate includes: a transparent bottom, wherein a second bio-recognition substance selectively reacting with a target bio-substance is modified on a surface of the bottom; a cover facing toward the bottom and having an inlet of a detection solution defined therein; and a sidewall disposed between the bottom and the cover and having a through-hole defined therein, wherein the substate has a fluid channel defined by the bottom, the cover and the sidewall, wherein the method comprises: a first step of mixing retroreflective particles with a detection solution containing the target bio-substance, wherein a first bio-recognition substance selectively reacting with the target bio-substance is modified on the retroreflective particles; a second step of placing the sensing substrate so that the bottom is located under the cover in a direction of gravity; a third step of injecting the detection solution containing therein the retroreflective particles into the fluid channel and maintaining the solution in the channel for a first time duration; a fourth step of turning the sensing substrate upside down so that the bottom is located above the cover in the direction of gravity and maintaining the sensing substrate in the turned state for a second time duration; a fifth step of irradiating light into the fluid channel through the bottom; and a sixth step of generating and analyzing an image based on light retroreflected from the retroreflective particles.

In one embodiment, each of the retroreflective particles includes: a transparent core particle; a total-reflective coated layer covering a portion of the core particle; and the first bio-recognition substance modified on an exposed face of the core particle.

In one embodiment, the first bio-recognition substance is selectively modified only on the exposed face of the core particle, wherein a thiol-based compound is coated on a surface of the total-reflective coated layer.

In one embodiment, a vertical dimension of the fluid channel is in a range of 50 to 1000 µm.

In one embodiment, in the first step, the retroreflective particles are mixed, at a concentration of 10 to 1000 µg/mL, with the detection solution.

In one embodiment, in the third step, the gravity causes the retroreflective particles to settle down toward the bottom and inside the fluid channel, wherein a selective reaction between the target bio-substance bound to the retroreflective particles and the second bio-recognition substance modified on the bottom occurs.

In one embodiment, in the third step, unreacted retroreflective particles not fixed to the bottom settle down toward the cover by gravity.

In one embodiment, in the fourth step, the sensing substrate is maintained in the turned state for the second time duration equal to or greater than 10 minutes.

In one embodiment, the sixth step includes: generating a plurality of consecutive captured images based on light retroreflected from the retroreflective particles for a third time duration using a time-lapse technique; processing the images in such a way as to maintain static pixels that have not changed for the third time duration and remove dynamic pixels that have changed for the third time duration; and counting retroreflective particles based on the processed images.

Technical Effects

According to the method for analyzing the bio-substance according to the present disclosure, the process of removing the optical label unreacted with the bio-substance is replaced with a process using sedimentation of the retroreflective particles due to gravity. Thus, the error caused by the analyst be minimized, and at the same time, the bio-substance may be accurately analyzed in a simple way.

DETAILED DESCRIPTIONS

Hereinafter, an embodiment of the present disclosure will be described in detail with reference to the accompanying drawings. The present disclosure may have various changes and modifications. Specific embodiments are illustrated in the drawings and are described in the Detailed descriptions. However, the embodiments are not intended to limit the present disclosure to specific forms. All changes, equivalents, and substitutes may be included in the spirit and scope of the present disclosure.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

The terminology used herein is for the purpose of describing particular embodiments only and is not intended to limit the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
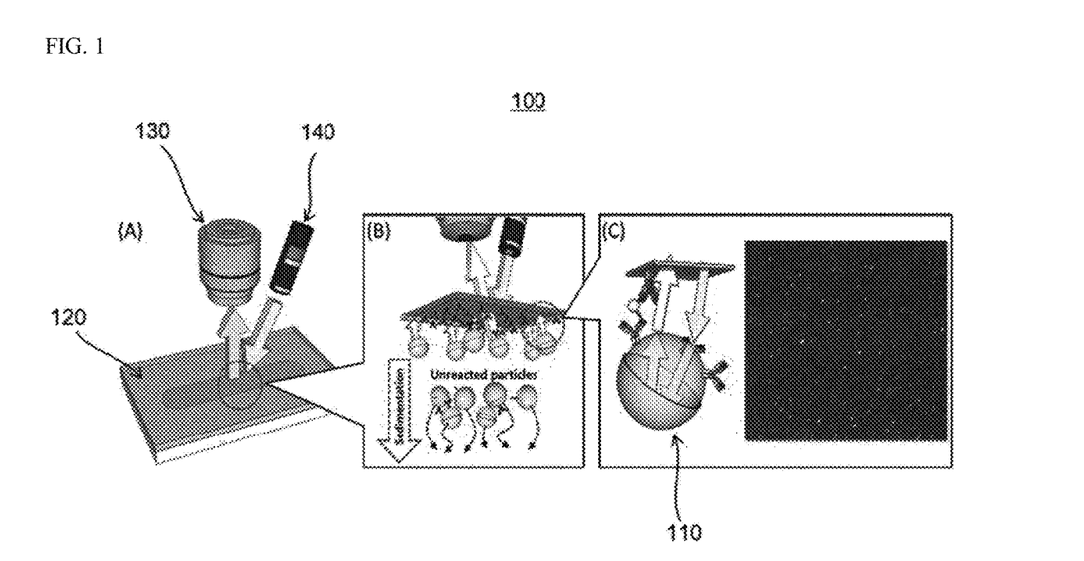
FIG. 1 is a schematic diagram for illustrating a bio-sensor according to an embodiment of the present disclosure.
Figure 2:
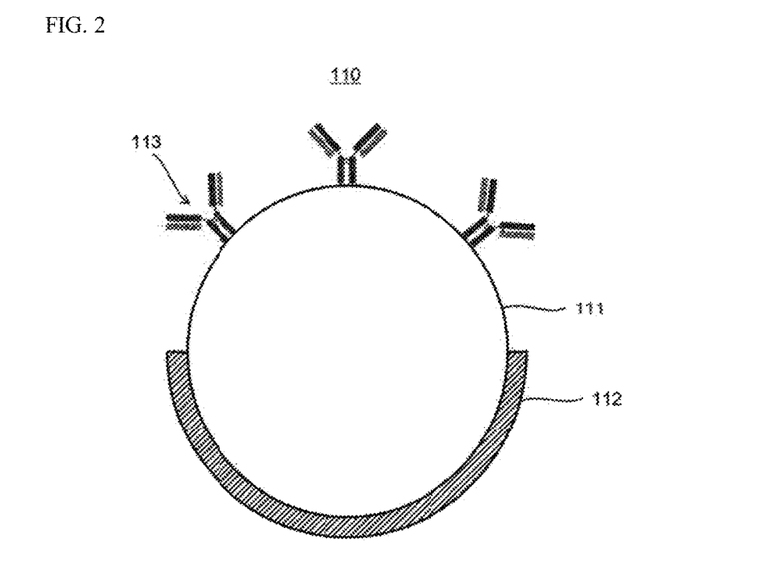
FIG. 2 and FIG. 3 are cross-sectional views for illustrating a sensing substrate and retroreflective particles shown in FIG. 1, respectively.
Figure 3:
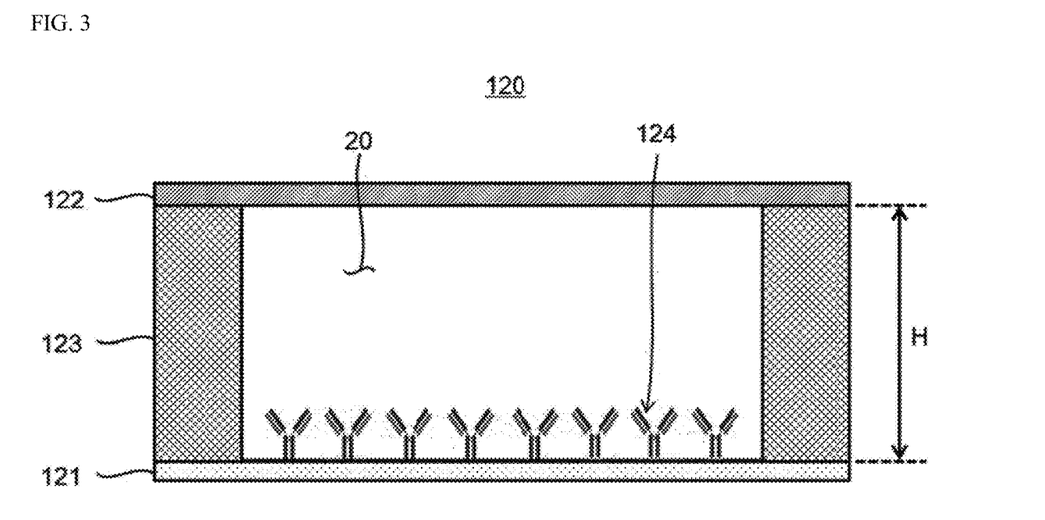

FIG. 1 is a schematic diagram for illustrating a bio-sensor according to an embodiment of the present disclosure. FIG. 2 and FIG. 3 are cross-sectional views for illustrating a sensing substrate and retroreflective particles as shown in FIG. 1, respectively.

Referring to FIG. 1 to FIG. 3, a bio-sensor 100 according to an embodiment of the present disclosure may include retroreflective particles 110, a sensing substrate 120, an image analyzer 130, and a light source 140.

The retroreflective particle 120 may selectively react with a target bio-substance and retroreflect incident light thereto toward the light source 140.

In one embodiment, the retroreflective particle 120 may include a transparent core particle 111, a total-reflective coated layer 112 covering a portion of the core particle 111, and a first bio-recognition substance 113 bonded directly or indirectly to an exposed face of the core particle 111.

The core particle 111 may have a spherical shape. As used herein, the term 'spherical' is defined to include not only a perfect sphere with the same radii from a center to all points on a surface, but also a substantial sphere with a difference of about 10% or smaller between maximum and minimum radii. The core particle 111 may have an average diameter in a range of about 600 nm to 5 μm, for example, of about 700 nm to 900 nm, based on binding characteristics thereof with the target bio-substance (not shown), a relationship thereof with a wavelength of light irradiated from the light source, and sedimentation characteristics thereof in a detection solution.

In one embodiment, the core particle 111 may be made of a transparent material capable of transmitting incident light therethrough. For example, the core particle 111 may be made of a transparent oxide or a transparent polymer. The transparent oxide may include, for example, silica, glass, etc. The transparent polymer may include, for example, polystyrene, poly(methyl methacrylate), and the like.

The total-reflective coated layer 112 may be formed to cover a portion of the surface of the core particle 111 and may totally reflect at least a portion of the light traveling inside the core particle 111 to increase an amount of light retroreflected toward the light source 140.

In an embodiment, the total-reflective coated layer 112 may be formed on the surface of the core particle 111 so as to cover an area of about 30% to 70% of the surface of the core particle 111. When the total-reflective coated layer 112 covers an area smaller than 30% of the surface of the core particle 111, a ratio of an amount of light not retroreflected but leaked relative to a total amount of the light incident into the core particle 111 is larger, such that a sensitivity of the bio-sensor 100 is lowered. When the total-reflective coated layer 112 covers an area greater than 70% of the surface of the core particle 111, an amount of light incident into the core particle 111 is reduced, such that the sensitivity of the bio-sensor 100 is lowered. In one embodiment, the total-reflective coated layer 112 may be formed on the surface of the core particle 111 so as to cover an area greater than or equal to about 40% and smaller than or equal to 60% of the surface of the core particle 111.

In one embodiment, in order that the total-reflective coated layer 112 totally reflects at least a portion of the light traveling inside the core particle 111 to increase an amount of light retroreflected toward the light source 140, the total-reflective coated layer 112 may be made of a material having a lower refractive index than that of the core particle 111. In one example, the core particle 111 may be made of a material having a refractive index of about 1.4 or greater in a visible light wavelength region of at least 360 nm to 820 nm. The total-reflective coated layer 112 may be made of a material having a refractive index smaller than that of the core particle 121. Specifically, when the core particle 111 is made of a transparent oxide or a transparent polymer having a refractive index of about 1.4 or greater in the visible ray region, the total-reflective coated layer 112 may be made of a metal having a refractive index smaller than that of the core particle 111. For example, the total-reflective coated layer 112 may be made of at least one metal selected from a group consisting of gold (Au) having a refractive index of about 0.22 with respect to light having a wavelength of 532 nm, silver (Ag) having a refractive index of about 0.15 with respect to light having a wavelength of 532 nm, aluminum (Al) having a refractive index of about 1.0 with respect to light having a wavelength of 532 nm, copper (Cu) having a refractive index of about 0.4 with respect to light having a wavelength of 532 nm, and zinc (Zn) having a refractive index of about 1.2 with respect to light having a wavelength of 532 nm.

In one embodiment, in order to prevent light leakage due to light transmission and improve dispersibility of the retroreflective particles 120 in the detection solution, the total-reflective coated layer 112 may have a thickness of about 10 to 500 nm. When the thickness of the total-reflective coated layer 112 is smaller than 10 nm, a portion of the light incident into the core particle 111 passes through the total-reflective coated layer 112 and leaks. When the thickness of the total-reflective coated layer 112 exceeds 500 nm, a weight of the optical label 110 increases, such that the dispersibility of the optical label 110 in the liquid is deteriorated.

The first bio-recognition substance 113 may be made of a substance capable of selectively binding to a target bio-substance. The first bio-recognition substance 113 may vary based on the target bio-substance to be detected, and may include at least one selected from proteins, nucleic acids, ligands, and the like. For example, when the target bio-substance is an antigen substance, the first bio-recognition substance 113 may be an antibody or aptamer substance that specifically reacts with the antigen substance. When the target bio-substance is a gene substance, the first bio-recognition substance 113 may be a nucleic acid substance such as DNA (deoxyribonucleic acid), RNA (ribonucleic acid), PNA (peptide nucleic acid), etc. capable of complementary binding to the gene substance. When the target bio-substance is a cell-signaling substance, the first bio-recognition substance 113 may be a chemical ligand substance that selectively binds to the cell-signaling substance.

The first bio-recognition substance 113 may be directly or indirectly bound to a portion of the surface of the core particle 111 as not covered with the total-reflective coated layer 112. In one embodiment, the first bio-recognition substance 113 may be selectively modified only onto the exposed surface of the core particle 111 and may not be modified on the surface of the total-reflective coated layer 112. For example, in a process of preparing the retroreflective particles, a substance that interferes with modification of the bio-recognition substance such as 6-mercapto-1-hexanol, 2-mercaptoethanol, 3-mercapto-1-propanol, 4-mercapto-1-butanol, 6-mercapto-1-hexanol, thiol-PEG is first modified onto a surface of the total-reflective coated layer 112, and then the retroreflective particles are added to a solution containing the bio-recognition substance at a high concentration level, such that the bio-recognition substance is modified only on the exposed surface of the core particle 111. Thus, when the first bio-recognition substance 113 is selectively modified only on the exposed surface of the core particle 111, the exposed surface of the core particle 111 may be oriented toward the image analyzer 130 as described below. Thus, a stronger retroreflection signal may be induced, and as a result, the sensitivity of the bio-sensor 100 may be improved.

The sensing substrate 120 may have a sealed fluid channel 20 for receiving therein a detection solution containing the target bio-substance and the retroreflective particle 110 coupled thereto. A second bio-recognition substance 124 that selectively binds to the target bio-substance may be modified on one face of the fluid channel 20.

In one embodiment, the sensing substrate 120 may include a bottom 121, a cover 122 and a sidewall 123, and the second bio-recognition substance 124.

The bottom 121 may be made of a transparent polymer material, and may constitute a bottom face of the fluid channel 20. In one embodiment, the bottom 121 may be made of a transparent polymer such as PMMA (poly(methyl methacrylate)), PC (polycarbonate), or PS (polystyrene).

The cover 122 may be disposed to face toward the bottom and may be spaced apart from the bottom, and may constitute a top face of the fluid channel 20. An inlet (not shown) through which the detection solution is injected into the fluid channel 20 may be defined in the cover 122. The cover 122 may be made of the same material as that of the bottom 121, or may be made of a different material from that of the bottom 121. In one embodiment, the cover 122 may be made of PDMS (polydimethylsiloxane), PS (polystyrene), PMMA (poly(methyl methacrylate)), COC (cyclic olefin copolymer), COP (cyclic olefin polymer), or the like.

The sidewall 123 may have a through-hole defined therein corresponding to the fluid channel 20, and may be disposed between the bottom 121 and the cover 122 to constitute a side face of the fluid channel 20. The sidewall 123 may be integrally formed with the bottom 121 and may be made of the same material as that of the bottom 121. Alternatively, the sidewall 123 may be made of a material different from that of the bottom 121.

Because a vertical dimension H of the fluid channel 20 is related to a sedimentation length of the retroreflective particles in the detection solution, the vertical dimension of the fluid channel 20 may be in a range of about 50 to 1000 μm.

The second bio-recognition substance 124 may be modified on a surface of the bottom 121 corresponding to a bottom surface of the fluid channel. The second bio-recognition substance 124 may be made of a substance capable of selectively binding to the target bio-substance. The second bio-recognition substance 124 may be the same substance as the first bio-recognition substance 113 of the retroreflective particle 110, or may be a different substance from the first bio-recognition substance 113. The second bio-recognition substance 124 may vary based on the target bio-substance to be detected, and may include at least one selected from proteins, nucleic acids, ligands, and the like. For example, when the target bio-substance is an antigen substance, the second bio-recognition substance 124 may be an antibody or aptamer substance that specifically reacts with the antigen substance. When the target bio-substance is a gene substance, the second bio-recognition substance 124 may be a nucleic acid substance such as DNA (deoxyribonucleic acid), RNA (ribonucleic acid), PNA (peptide nucleic acid), etc. capable of complementary binding to the gene substance. When the target bio-substance is a cell-signaling substance, the second bio-recognition substance 124 may be a chemical ligand substance that selectively binds to the cell-signaling substance.

In one embodiment, the detection solution containing the retroreflective particles 110 may be injected into the fluid channel 20 of the sensing substrate 120. For example, the retroreflective particles 110 are added to the detection solution and thus the target bio-substance reacts with the retroreflective particles 110 in the detection solution. Then, the solution may be injected into the fluid channel 20 of the sensing substrate 120.

Then, the detection solution is injected into the fluid channel 20 and then the is maintained therein for a first time duration, such that the target bio-substance reacted with the retroreflective particle 110 may selectively react with the second bio-recognition substance 124 of the sensing substrate 120. For example, when the detection solution is injected into the fluid channel 20 and then the is maintained therein for the first time duration while the sensing substrate 120 is oriented so that the bottom 121 is located under the cover 122 in a direction of gravity, the retroreflective particles 110 settle down onto the bottom 121 by gravity, and the target bio-substance bound with the retroreflective particles 110 selectively reacts with the second bio-recognition substance 124 modified on the bottom 121.

Then, the sensing substrate 120 is turned upside down so that the bottom 121 is located above the cover 122 and then this turned state is maintained for a second time duration, such that the retroreflective particles 110 unreacted with the second bio-recognition substance 124 may settle down toward the cover 122. For example, when the sensing substrate 120 is turned upside down so that the bottom 121 is located above the cover 122 and then this turned state is maintained for the second time duration, the retroreflective particles 110 bound to the second bio-recognition substance 124 via the target bio-substance among the retroreflective particles 110 remain at a position adjacent to the bottom 121, while the unreacted retroreflective particles 110 that do not react with the second bio-recognition substance 124 settle down toward the cover 122 by gravity.

After the turned state has been maintained for the second time duration, the light source 140 may irradiate light from a position above the bottom 121 of the sensing substrate 120 into the fluid channel 20. The light source 130 may irradiate a mixture of light beams of various wavelengths or may irradiate monochromatic light of a specific wavelength. For example, the light source 140 may emit white light.

When the light source 140 irradiates the light into the fluid channel 20 through the transparent bottom 121, the retroreflective particles 110 coupled to the second bio-recognition substance 124 via the target bio-substance may retroreflect the incident light thereto. In this case, because the first bio-recognition substance 113 selectively reacting with the target bio-substance is modified on the exposed surface of the core particle 111 of the retroreflective particle 110, the retroreflective particles 110 bound to the second bio-recognition substance 124 via the target bio-substance may be oriented such that the exposed surface of the core particle 111 thereof faces toward the bottom 121 of the sensing substrate 120. As a result, when light is irradiated thereto from the light source 140, the retroreflective particles 110 may generate a stronger retroreflective signal.

The image analyzer 130 receives light retroreflected from retroreflective particles 110 inside the fluid channel and generates an image based on the received light, and analyzes the image to obtain information on a concentration of the target bio-substance in the detection solution.

In an embodiment, the image analyzer 130 includes an image generator for imaging the retroreflected optical signal, an image processor for processing the image generated from the image generator, and an image analyzing unit for analyzing the image processed by the image processor.

The image generator may generate a plurality of consecutively captured images for a preset time duration using a time-lapse technique. For example, the image generator may perform continuous capturing of about 4 or more times within about 1 to 2 seconds and may generate images thereof.

The image processor may analyze the plurality of consecutively captured images, and then may process the images in such a way that static pixels that do not change for the preset time duration are maintained and dynamic pixels that have changed for the preset time duration are removed. When the images are processed in this way, an error caused by the light retroreflected from the unreacted retroreflective particles may be minimized.

The image analyzing unit may analyze the image processed by the image processor to generate quantitative information such as the concentration of the target bio-substance. For example, the image analyzing unit may calculate the number of retroreflective particles from the image and generate quantitative information of the target bio-substance based on the calculated number.

Figure 4:
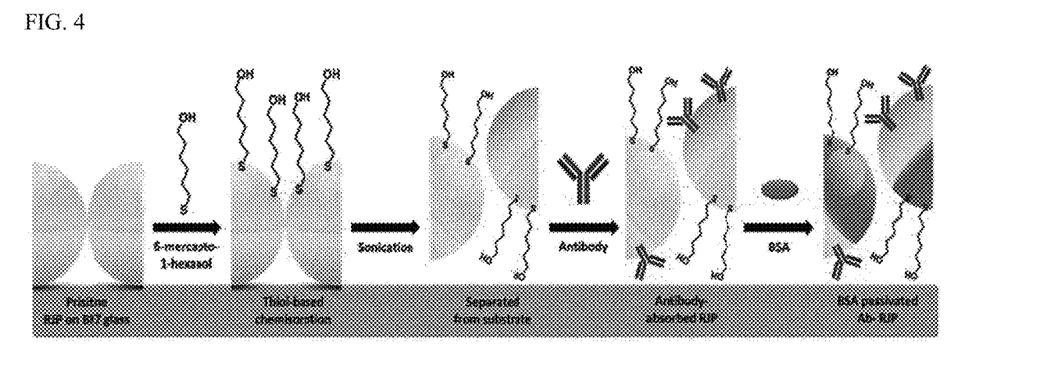
FIG. 4 is a view for illustrating an embodiment of a method for selectively modifying an exposed surface of a core particle of a retroreflective particle with a first bio-recognition substance.

FIG. 4 is a view for illustrating an embodiment of a method for selectively modifying the exposed surface of the core particle of the retroreflective particle with the first bio-recognition substance.

Referring to FIG. 4, single-layer core particles arranged on a substrate at a high-density may be formed and then, a total-reflective coated layer may be formed on a hemispherical surface of each of the core particle using an ion beam deposition scheme.

Then, an alkanethiol compound acting as a spacer may be modified on a surface of the total-reflective coated layer such that the surface may be passivated. Then, the particles may be separated from the substrate. For example, the alkanethiol compound may include 6-mercapto-1-hexanol, 2-mercaptoethanol, 3-mercapto-1-propanol, 4-mercapto-1-butanol, 6-mercapto-1-hexanol, thiol-PEG and the like.

Then, the particles in which the total-reflective coated layer has been passivated with the alkanethiol compound are added to a solution containing the first bio-recognition substance at a high concentration level. Thus, the first bio-recognition substance may be adsorbed to the exposed surface of the core particle.

Subsequently, in order to minimize non-specific binding of the retroreflective particles, BSA (Bovine Serum Albumin) may be selectively coated on an unmodified region of the total-reflective coated layer.

Figure 5:
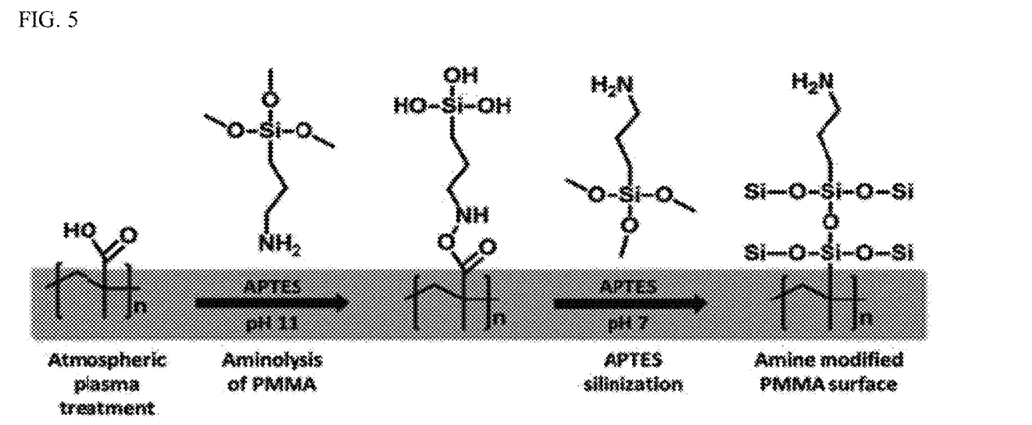
FIG. 5 is a view for illustrating an embodiment of a surface treatment process for fixing a second bio-recognition substance to a bottom of the sensing substrate made of PMMA.

FIG. 5 is a view for illustrating an embodiment of a surface treatment process for fixing the second bio-recognition substance to the bottom of the sensing substrate made of PMMA.

Referring to FIG. 5, a carboxyl group may be introduced on the PMMA substrate by performing atmospheric plasma treatment on the PMMA substrate.

Subsequently, silanization may be repeatedly performed through aminolysis. Thus, an amine group may be exposed from a surface.

Subsequently, the second bio-recognition substance may be immobilized on the surface of the PMMA substrate using a cross-linker compound that reacts with the amine group and the second bio-recognition substance. For example, when the second bio-recognition substance is an antibody substance, glutaraldehyde, a succinimidyl ester-based compound may be used as the cross-linker compound. For example, a $BS^3$ (bis(sulfosuccinimidyl) suberate) compound may be used as the cross-linker compound.

Hereinafter, the quantitative analysis method of the target bio-substance using the bio-sensor 100 as described with reference to FIG. 1 to FIG. 5 will be described in detail.

Figure 6:
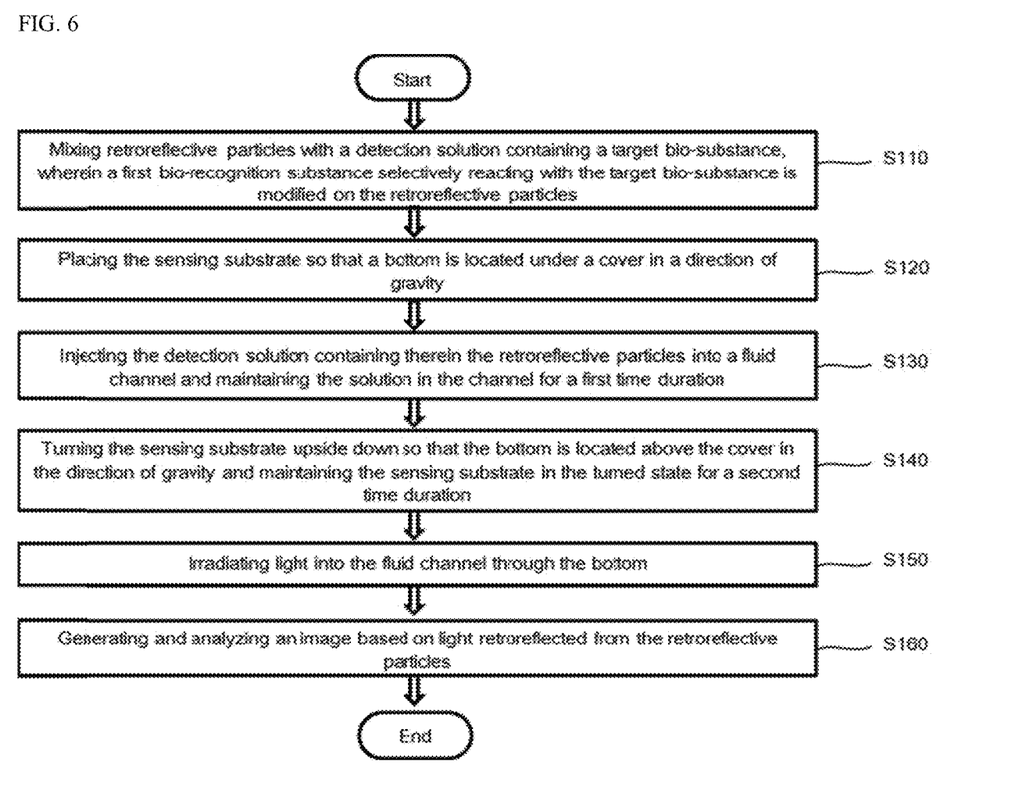
FIG. 6 is a flowchart for illustrating a quantitative analysis method of a bio-substance according to an embodiment of the present disclosure.

FIG. 6 is a flowchart for illustrating the quantitative analysis method of the bio-substance according to an embodiment of the present disclosure.

Figure 7:
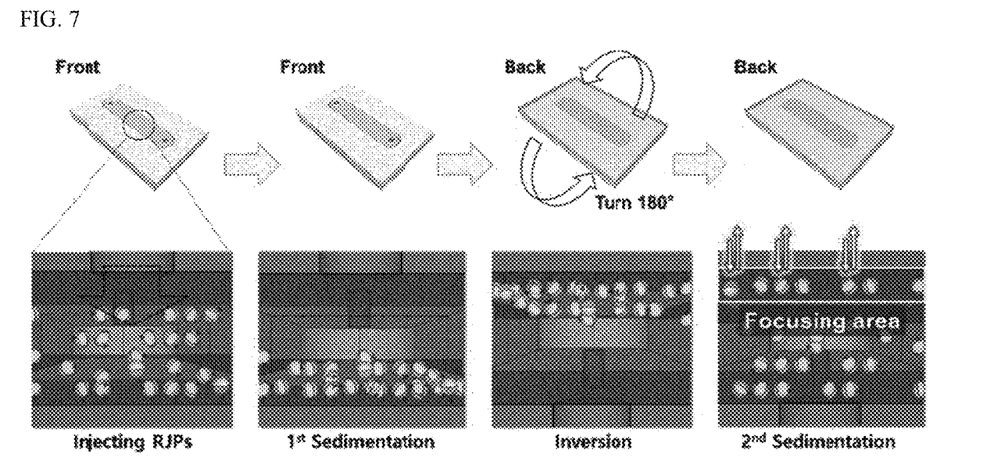
FIG. 7 is a diagram for illustrating sedimentation of retroreflective particles due to rotation of the sensing substrate.

FIG. 7 is a diagram for illustrating sedimentation of retroreflective particles due to rotation of the sensing substrate.

Referring to FIG. 6 and FIG. 7 together with FIG. 1 to FIG. 5, the quantitative analysis method of the bio-substance according to an embodiment of the present disclosure includes a first step S110 of mixing the retroreflective particles 110 modified with the first bio-recognition substance 113 that selectively reacts with the target bio-substance with a detection solution containing the target bio-substance; a second step S120 of placing the sensing substrate 120 so that the bottom 121 modified with the second bio-recognition substance 124 selectively reacting with the target bio-substance is located below the cover 122 in a direction of gravity; a third step S130 of injecting the detection solution mixed with the retroreflective particles 110 into the fluid channel 20 of the sensing substrate 120 and maintaining the solution therein for a first time duration; a fourth step S140 of turning the sensing substrate 120 upside down so that the bottom 121 is located above the cover 122 in the direction of gravity and maintaining the turned state for a second time duration; a fifth step S150 of irradiating light into the fluid channel 20 through the bottom 121; and a sixth step S160 of generating and analyzing an image based on light retroreflected from the retroreflective particles.

In the first step S110, the retroreflective particles 110 are mixed with the detection solution containing the target bio-substance such that the first bio-recognition substance 113 of the retroreflective particles 110 reacts with the target bio-substance. In this case, a sufficient number of retroreflective particles may be mixed with the detection solution so that all target bio-substances may react with the retroreflective particles 110.

In the second step S120 and the third step S130, in a state in which the sensing substrate 120 is oriented so that the bottom 121 on which the second bio-recognition substance 124 is modified is located under the cover 122 in the direction of gravity, the detection solution containing the retroreflective particles 110 and the target bio-substance reacted therewith is injected into the fluid channel through a detection solution inlet (not shown) defined in the cover. Thus, the gravity causes the retroreflective particles 110 to sink downward, that is, toward the bottom 121 of the sensing substrate 120. As a result, a selective reaction occurs between the second bio-recognition substance modified on the bottom 121 and the target bio-substance bound to the retroreflective particles 110. That is, the retroreflective particles 110 reacted with the target bio-substance are fixed to the bottom 121 through the target bio-substance, while the retroreflective particles 110 that do not react with the target bio-substance are not fixed to the bottom 121.

In the fourth step S140, the sensing substrate 120 is turned upside down so that the bottom 121 is positioned above the cover 122 in the direction of gravity and the turned state is maintained for a second time duration. Thus, the retroreflective particles 110 fixed to the bottom 121 are maintained at a relatively fixed position, while the unreacted retroreflective particles 110 not fixed to the bottom 121 settle downward, that is, toward the cover 122 by gravity.

In the fifth step S150 and the sixth step S160, when light is irradiated into the fluid channel 20 through the bottom 121, the retroreflective particles fixedly located at a position adjacent to the bottom 121 may strongly retroreflect the incident light thereto. However, the unfixed and unreacted retroreflective particles at the bottom 121 may sink downwards and may be suspended and thus may weakly retroreflect the incident light.

Further, because the first bio-recognition substance 113 is modified only on the exposed surface of the core particle 111 of the retroreflective particle 110, the retroreflective particles 110 fixed to the bottom 121 are oriented so that the exposed surface of the core particle 111 thereof faces toward the bottom 121 of the sensing substrate 120. However, the unreacted retroreflective particles 110 that are not fixed to the bottom 121 are in a suspended state, and thus, orientation directions thereof may be irregular, and the orientation direction may change over time.

For this reason, in order to minimize analysis error due to the light retroreflected from the unreacted retroreflective particles that are not fixed to the bottom 121, in the sixth step S160, a plurality of images may be continuously captured for a preset time duration using the time-lapse technique. Then, the images may be processed in such a way that the static pixels that do not change for the preset time duration are maintained, and the dynamic pixels that change for the preset time duration are removed. Then, the number of retroreflective particles fixed to the bottom 121 may be calculated based on the processed image. Thus, quantitative information such as the concentration of the target bio-substance may be obtained.

According to the bio-sensor and the method for analyzing the bio-substance using the same according to the present disclosure, the process of removing the optical label unreacted with the bio-substance is replaced with the sedimentation process of the retroreflective particles by gravity, thereby minimizing the error caused by the analyst and analyzing the bio-substance accurately in a simple way.

Hereinafter, examples of the present disclosure will be described in detail. However, the following examples are merely exemplary embodiments of the present disclosure, and the scope of the present disclosure is not limited to the following examples.

Sedimentation Characterization of Retroreflective Particles

The sensing substrate having a vertical dimension of 500 μm and having the fluid channel having the bottom modified with the second bio-recognition substance was prepared. Then, three types of detection solutions were prepared by mixing retroreflective particles with concentrations of 50, 75, and 100 μg/mL respectively with detection solutions containing the same concentration of the bio-substance.

Each of the three detection solutions was injected into the fluid channel. A first sedimentation process was performed for about 30 minutes, then the sensing substrate was inverted or turned upside down. Then, the number of retroreflective particles over time for 1 hour after the sensing substrate was inverted was measured.

Figure 8:
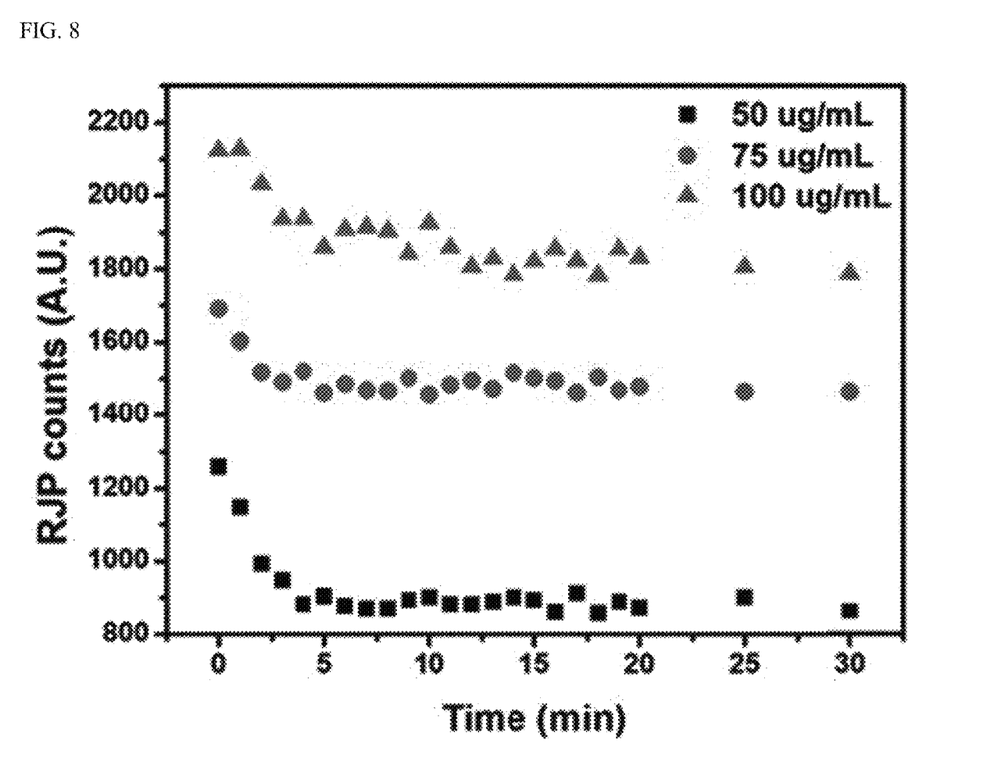
FIG. 8 is a graph showing a measurement result of change in the number of retroreflective particles over time after the sensing substrate is inverted.

FIG. 8 is a graph showing a measurement result of change in the number of retroreflective particles over time after the sensing substrate is inverted.

Referring to FIG. 8, regarding all samples, a quantity of retroreflective particles changed rapidly during 5 to 10 minutes directly after the sensing substrate was inverted, but the change in the quantity of retroreflective particles measured thereafter was slight. Therefore, a time duration for which a second sedimentation process of the retroreflective particles is performed is preferably set to about 5 to 10 minutes or greater.

Further, the greatest change in a separation yield was measured in the solution containing the retroreflective particles at the concentration of 50 μg/mL. Therefore, it is determined that the concentration of the retroreflective particles injected into the detection solution is preferably about 40 to 60 μg/mL.

Quantitative Analysis of CK-MB Markers

The retroreflective particles modified with a detection antibody were added, at a concentration of 50 μg/mL, to a human serum CK-MB detection solution at each of concentrations of 0, 0.1, 1, 10, 100, or 1000 ng/ml. Thus, the retroreflective particles and CK-MB reacted with each other.

Then, the detection solution after the reaction was injected into a PMMA sensor substrate on which a capture antibody was immobilized and then the solution was maintained therein for a certain period of time. Thus, the capture antibody and CK-MB reacted with each other.

Then, the sensor substrate was turned upside down, and the turned state was maintained for about 10 to 15 minutes. Then, the light source irradiated light into the fluid channel. Then, images based on retroreflected light were obtained via a time-lapse imaging technique. Using ImageJ S/W, retroreflective particles existing on a designated area were counted.

Figure 9:
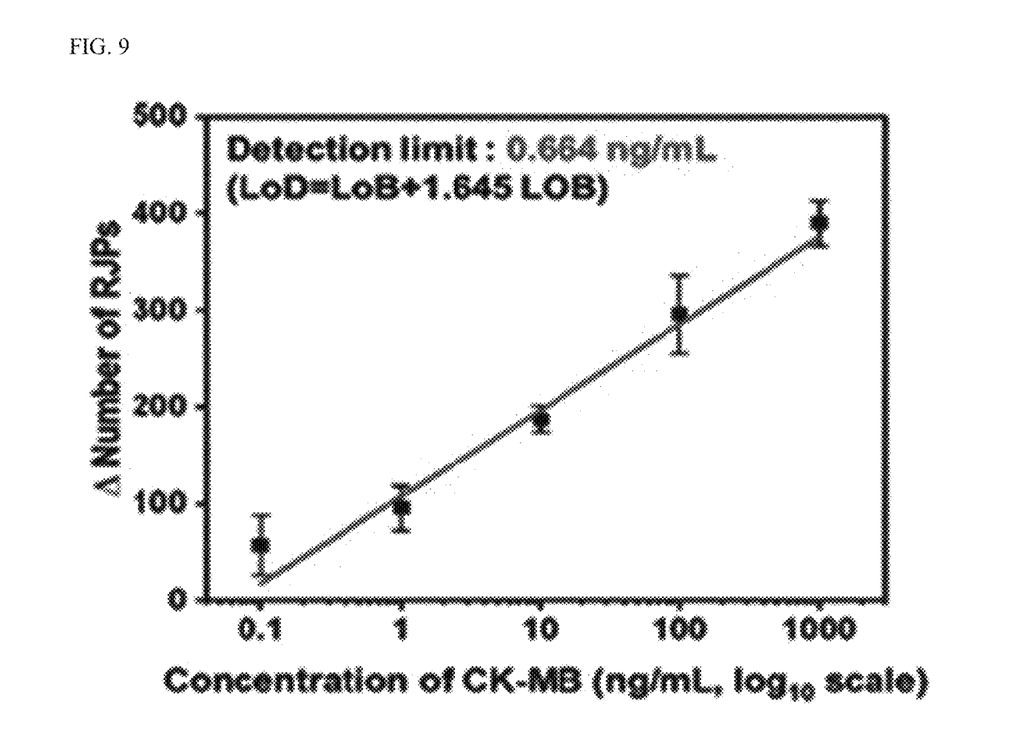
FIG. 9 shows a result of analyzing CK-MB detection solutions according to the present disclosure.

FIG. 9 shows an analysis result of the CK-MB detection solutions.

Referring to FIG. 9, a limit of detection (LOD) as calculated of CK-MB measured in a human serum sample was 0.664 ng/mL, and a maximum value of a coefficient of variability (CV) was 6.82%.

From the above results, it may be identified that the quantitative analysis of the bio-substance according to the present disclosure may perform accurate analysis with a remarkably low CV.

Although the disclosure has been described above with reference to the preferred embodiment of the present disclosure, it will be understood by those skilled in the art that various modifications and changes may be made to the present disclosure without departing from the spirit and scope of the present disclosure as set forth in the following claims.

What is claimed is:

1. A method for analyzing a target bio-substance using a sensing substrate, wherein the sensing substrate includes:
   a transparent bottom, wherein a second bio-recognition substance selectively bound to the target bio-substance attached to a surface of the bottom;
   a cover facing toward the bottom and having an inlet of a detection solution defined therein; and
   a sidewall disposed between the bottom and the cover and having a through-hole defined therein,
   wherein the substrate has a fluid channel defined by the bottom, the cover and the sidewall,
   wherein the method comprises:
   a first step of mixing retroreflective particles with the detection solution containing the target bio-substance, wherein a first bio-recognition substance selectively with bound to the target bio-substance is attached to the retroreflective particles;
   a second step of placing the sensing substrate so that the bottom is located under the cover in a direction of gravity;
   a third step of injecting the detection solution containing therein the retroreflective particles into the fluid channel and maintaining the detection solution in the channel for a first time duration;
   a fourth step of turning the sensing substrate upside down so that the bottom is located above the cover in the direction of gravity and maintaining the sensing substrate in the turned state for a second time duration;
   a fifth step of irradiating light into the fluid channel through the bottom; and
   a sixth step of generating and analyzing a plurality of consecutive captured images based on light retroreflected from the retroreflective particles,
   wherein the sixth step includes:
   generating the plurality of consecutive captured images based on light retroreflected from the retroreflective particles for a third time duration using a time-lapse technique,
   processing the captured images in such a way as to maintain static pixels, in the captured images, that have not changed for the third time duration and remove dynamic pixels, in the captured images, that have changed for the third time duration, and
   counting retroreflective particles corresponding to the static pixels based on the processed images.

2. The method of claim 1, wherein each of the retroreflective particles includes:
   a transparent core particle;
   a reflective coated layer covering a portion of the core particle; and
   the first bio-recognition substance attached to an exposed face of the core particle.

3. The method of claim 2, wherein the first bio-recognition substance is selectively attached to only the exposed face of the core particle,
   wherein a thiol-based compound is coated on a surface of the reflective coated layer.

4. The method of claim 1, wherein a vertical dimension of the fluid channel is in a range of 50 to 1000 μm.

5. The method of claim 1, wherein in the first step, the retroreflective particles are mixed, at a concentration of 10 to 1000 μg/mL, with the detection solution.

6. The method of claim 1, wherein in the third step, the gravity causes the retroreflective particles to settle down toward the bottom and inside the fluid channel,
   wherein a selective bonding between the target bio-substance bound to the retroreflective particles and the second bio-recognition substance attached to the bottom occurs.

7. The method of claim 1, wherein in the fourth step, unbound retroreflective particles not fixed to the bottom settle down toward the cover by gravity.

8. The method of claim 1, wherein in the fourth step, the sensing substrate is maintained in the turned state for the second time duration equal to or greater than 10 minutes.

9. A method for analyzing a target bio-substance using a sensing substrate, wherein the sensing substrate includes:
   a transparent bottom, wherein a second bio-recognition substance selectively bound to the target bio-substance is attached to a surface of the bottom;
   a cover facing toward the bottom and having an inlet of a detection solution defined therein; and
   a sidewall disposed between the bottom and the cover and having a through-hole defined therein,
   wherein the substrate has a fluid channel defined by the bottom, the cover and the sidewall,
   wherein the method comprises:
   a first step of mixing retroreflective particles with the detection solution containing the target bio-substance, wherein a first bio-recognition substance selectively bound to the target bio-substance is attached to the retroreflective particles,
   a second step of placing the sensing substrate so that the bottom is located under the cover in a direction of gravity,
   a third step of injecting the detection solution containing therein the retroreflective particles into the fluid channel and maintaining the detection solution in the channel for a first time duration, a fourth step of turning the sensing substrate upside down so that the bottom is located above the cover in the direction of gravity and maintaining the sensing substrate in the turned state for a second time duration, a fifth step of irradiating light into the fluid channel through the bottom, and a sixth step of generating and analyzing a plurality of consecutive captured images based on light retroreflected from the retroreflective particles, and wherein the sixth step comprises:

generating the plurality of consecutive captured images based on light retroreflected from the retroreflective particles for a third time duration using a time-lapse technique, processing the captured images in such a way as to maintain static pixels, in the captured images, that have not changed for the third time duration and remove dynamic pixels, in the captured images, that have changed for the third time duration, and after passing third time duration, imaging results of binding between the retroreflective particles and the target bio-substance using the processed images.

* * * * *